US008910513B2

United States Patent
Toyofuku (10) Patent No.: US 8,910,513 B2
(45) Date of Patent: Dec. 16, 2014

(54) TIRE INNER PRESSURE MEASUREMENT SYSTEM

(75) Inventor: Masanobu Toyofuku, Higashimurayama (JP)

(73) Assignee: Birdgestone Corporation, Tokyo (JP)

( * ) Notice: Subject to any disclaimer, the term of this patent is extended or adjusted under 35 U.S.C. 154(b) by 2 days.

(21) Appl. No.: 13/814,575

(22) PCT Filed: Aug. 2, 2011

(86) PCT No.: PCT/JP2011/067660
§ 371 (c)(1),
(2), (4) Date: Feb. 6, 2013

(87) PCT Pub. No.: WO2012/020663
PCT Pub. Date: Feb. 16, 2012

(65) Prior Publication Data
US 2013/0133415 A1    May 30, 2013

(30) Foreign Application Priority Data
Aug. 9, 2010  (JP) ................. 2010-178940

(51) Int. Cl.
 *B60C 23/02* (2006.01)
 *B60C 23/04* (2006.01)
 *G01L 17/00* (2006.01)

(52) U.S. Cl.
CPC ............ *B60C 23/04* (2013.01); *B60C 23/0428* (2013.01); *B60C 23/0479* (2013.01); *G01L 17/00* (2013.01); *B60C 23/0496* (2013.01)
USPC ......................................... 73/146.5; 340/447

(58) Field of Classification Search
None
See application file for complete search history.

(56) References Cited

U.S. PATENT DOCUMENTS

| | | | |
|---|---|---|---|
| 4,300,118 A | 11/1981 | Matsuda et al. | |
| 4,578,992 A | 4/1986 | Galasko et al. | |
| 4,918,423 A | 4/1990 | Fukuyama et al. | |
| 2007/0220986 A1* | 9/2007 | Smith et al. ........... | 73/727 |

(Continued)

FOREIGN PATENT DOCUMENTS

| | | |
|---|---|---|
| EP | 0 301 443 A1 | 2/1989 |
| JP | A-64-028529 | 1/1989 |

(Continued)

OTHER PUBLICATIONS

Extended Search Report issued in European Patent Application No. 11816329.4 dated Dec. 4, 2013.

(Continued)

*Primary Examiner* — Andre Allen
(74) *Attorney, Agent, or Firm* — Oliff PLC (57) ABSTRACT

A tire internal pressure measuring system includes a detector for detecting the internal pressure of a tire, and an acquisition device for acquiring data relating to the internal pressure of the tire detected by the detector. An antenna unit of the acquisition device generates induced electromotive force in an antenna unit of the detector by electromagnetic induction, and acquires a resonant waveform in tune with the resonance of an LC resonance circuit configured from a capacitance sensor charged with the electromotive force generated in the antenna unit and the antenna unit. The acquired resonant waveform is frequency-divided, and a capacitor (C) is charged during a period from the rising edge to the falling edge of the waveform obtained by the frequency dividing. The value of charged voltage is associated with the tire internal pressure.

9 Claims, 7 Drawing Sheets

(56) References Cited

U.S. PATENT DOCUMENTS

2008/0042819 A1* 2/2008 Masudaya .................... 340/447
2008/0168834 A1 7/2008 Suzuki et al.
2013/0336095 A1* 12/2013 Seppa et al. ................. 367/137

FOREIGN PATENT DOCUMENTS

| JP | U-05-030747 | 4/1993 |
|----|----|----|
| JP | A-08-136383 | 5/1996 |
| JP | A-2004-163134 | 6/2004 |
| WO | WO 87/03544 A1 | 6/1987 |
| WO | WO 2006/095698 A1 | 9/2006 |

OTHER PUBLICATIONS

International Search Report issued in Application No. PCT/JP2011/067660; Dated Nov. 15, 2011 (With Translation).

* cited by examiner

TIRE INNER PRESSURE MEASUREMENT SYSTEM

BACKGROUND

1. Technical Field of the Invention

The present invention relates to a tire inner pressure measurement system including a pressure sensor for detecting the inner pressure of a tire and an acquisition apparatus for acquiring data regarding the tire inner pressure detected by the pressure sensor.

2. Background Art

As a conventional method for inspecting the inner pressure of a tire, there has been proposed a tire inner pressure measurement system that detects inner pressure data, which is measured by a pressure sensor provided in a rim wheel mounted with a tire, through a reader unit provided in a vehicle in a non-contact manner (refer to Patent Literature 1).

In the aforementioned tire inner pressure measurement system, a detector including the pressure sensor and the reader unit for acquiring the inner pressure data from the detector are provided with an antenna unit including a coil, respectively. The detector is configured to accumulate induced electromotive force, which is generated by electromagnetic induction occurring between the antenna units, by using a capacitor such that component circuits are driven.

Furthermore, the detector converts the a pressure signal, which corresponds to the inner pressure data detected by the pressure sensor, to a digital signal using a control circuit, and then converts the digital signal to an analog signal suitable for transmission using electric waves. Then, the detector outputs the analog signal to the reader unit through an antenna unit including a coil.

CITATION LIST

Patent Literature

[PLT 1] Japanese Patent Application Publication No. H08-136383, FIG. 1, etc.

SUMMARY

However, the aforementioned tire inner pressure measurement system has the following problems.

The antenna unit of the detector includes a resonance circuit including a capacitor and a coil. When the inner pressure data is transmitted/received using the resonance circuit, it is probable that the detection accuracy of data is reduced by the influence of noise.

Therefore, the present invention has been achieved in view of the above-described problems, and an object thereof is to increase the detection accuracy of tire inner pressure in a tire inner pressure measurement system including a detector having a resonance circuit and an acquisition apparatus for acquiring the inner pressure data of a tire from the detector.

To solve the above problem, a feature of the present invention is summarized as a tire inner pressure measurement system (tire inner pressure measurement system 1) comprising: a detector (detector 40) that detects the inner pressure of a tire (tire 10) and an acquisition apparatus (acquisition apparatus 20) that acquires data regarding the inner pressure of the tire detected by the detector, wherein the detector comprises: a resonance circuit that includes: a capacitive sensor (capacitive sensor 41) having capacitance changed according to a change in an inter-electrode distance by the inner pressure of the tire; and a detection-side antenna unit (antenna unit 42) formed by a coil, the coil being obtained by winding a conductive wire around a coil material, the antenna unit being connected to the capacitive sensor, the acquisition apparatus comprises: an acquisition-side antenna unit (antenna unit 51) that is formed by a coil obtained by winding a conductive wire around a coil material, that generates electromotive force in the detection-side antenna unit by electromagnetic induction, and that acquires resonant waveforms of the resonance circuit including the capacitive sensor charged by the electromotive force and the detection-side antenna unit; a driving unit (pulse oscillation unit 52 and switching circuit 53) that applies electromotive force to the detection-side antenna unit; a signal amplification unit (amplification circuit 54) that amplifies the resonant waveforms; a division unit (division circuit 55) that divides a predetermined number of waveforms among the amplified resonant waveforms; a conversion unit (conversion unit 56, 57) that converts a period from rise to fall of a waveform obtained by dividing the waveforms into a voltage value; and a pressure calculation unit (pressure calculation unit 58) that calculates the inner pressure of the tire based on the voltage value converted by the conversion unit.

According to the present invention, the acquisition apparatus does not directly associate a change amount of the resonant frequency of the resonant waveform generated in the detector with a change amount of the inner pressure of the tire, and converts the period from the rise to the fall of the waveform obtained by dividing the resonant waveforms into the voltage value. Specifically, the acquisition apparatus is configured to be able to acquire the resonant waveform of the resonance circuit including the capacitive sensor charged by electromotive force and the detection-side antenna unit, and to measure the tire inner pressure associated with the period from the rise to the fall of the resonant waveform. Consequently, a change amount of the resonant frequency of the resonant waveform generated in the detector is not directly associated with a change amount of the tire inner pressure, so that it is possible to suppress the reduction of accuracy due to the influence of noise.

Since a conventional detector includes an antenna unit, a sensor unit, a control circuit and the like, there is a problem that a maintenance cost necessary for mounting and exchanging the detector is high.

Moreover, in the conventional detector, since a casing accommodating the antenna unit, the sensor unit, the control circuit and the like is installed (alternatively, the casing is mounted, instead of an existing valve, using an opening of a rim in which the existing valve is mounted) at an installation portion newly provided in a rim wheel, wheel balance may be lost and a load may be applied to a tire.

On the other hand, in accordance with the tire inner pressure measurement system according to the present invention, it is possible to simplify the structure of the detector. Consequently, it is possible to reduce the weight of the detector as compared with the conventional detector, to reduce influence to wheel balance, and to reduce a load to a tire. Furthermore, it is possible to reduce a manufacturing cost, thereby suppressing a maintenance cost necessary for exchanging the detector.

Furthermore, the acquisition apparatus does not directly associate a change amount of the resonant frequency of the resonant waveform generated in the detector with a change amount of the inner pressure of the tire, and converts the period from the rise to the fall of the waveform obtained by dividing the resonant waveforms into the voltage value, so that it is possible for the acquisition apparatus to have an inexpensive configuration.

In the above feature of the present invention, the conversion unit (conversion unit 56) comprises: a CR charging circuit (CR charging circuit 561) having a capacitor and a resistor, and the conversion unit charges the capacitor over the period from the rise to the fall of the waveform obtained by dividing the waveforms, and associates a voltage value charged in the capacitor with the inner pressure of the tire.

In the above feature of the present invention, the conversion unit comprises: an integration circuit (integration circuit 571), and the conversion unit associates a voltage value integrated over the period from the rise to the fall of the waveform obtained by dividing the waveforms, with the inner pressure of the tire.

In the above feature of the present invention, a rim wheel mounted with the tire is provided with a valve (valve 30) for injecting air, and the valve comprises: a valve core (valve core 31) including an air room-side end portion (air room-side end portion 31e) communicating with an air room formed between the tire and the rim wheel, and an inlet (inlet 31a); a valve stem (valve stem 32) into which the valve core is inserted; and a valve cap (valve cap 33) mounted around the valve stem to cover the inlet of the valve core, and the capacitive sensor and the detection-side antenna unit are arranged in the valve cap.

In the above feature of the present invention, a rim wheel mounted with the tire is provided with a valve for injecting air, and the valve comprises: a valve core including an air room-side end portion communicating with an air room formed between the tire and the rim wheel, and an inlet; a valve stem into which the valve core is inserted; and a valve cap mounted around the valve stem to cover the inlet of the valve core, and the capacitive sensor is arranged at the air room-side end portion of the valve core, the detection-side antenna unit is arranged in the valve cap, and the capacitive sensor is electrically connected to the detection-side antenna unit.

According to the present invention, it is possible to improve the detection accuracy of the inner pressure of the tire in the tire inner pressure measurement system comprising the detector having the resonance circuit and the acquisition unit acquiring the inner pressure data of the tire from the detector.

DETAILED DESCRIPTION

An embodiment of a tire inner pressure measurement system 1 according to the present invention is explained with reference to drawings. Specifically, (1) Description of schematic configuration of tire inner pressure measurement system, (2) Description of configuration of detector and arrangement position of detector, (3) Circuit configuration of tire inner pressure measurement system, (4) Operation and effect, (5) Modification of detector, and (6) Other embodiments will be explained.

In the following description of the drawings, the same or similar reference numerals are used to designate the same or similar parts. It will be appreciated that the drawings are schematically shown and the ratio and the like of each dimension are different from the real ones. Therefore, the specific dimensions must be determined in view of the below explanation. Further, the relationship between the dimensions and their proportions may be different in some cases even among the drawings.

Figure 1:
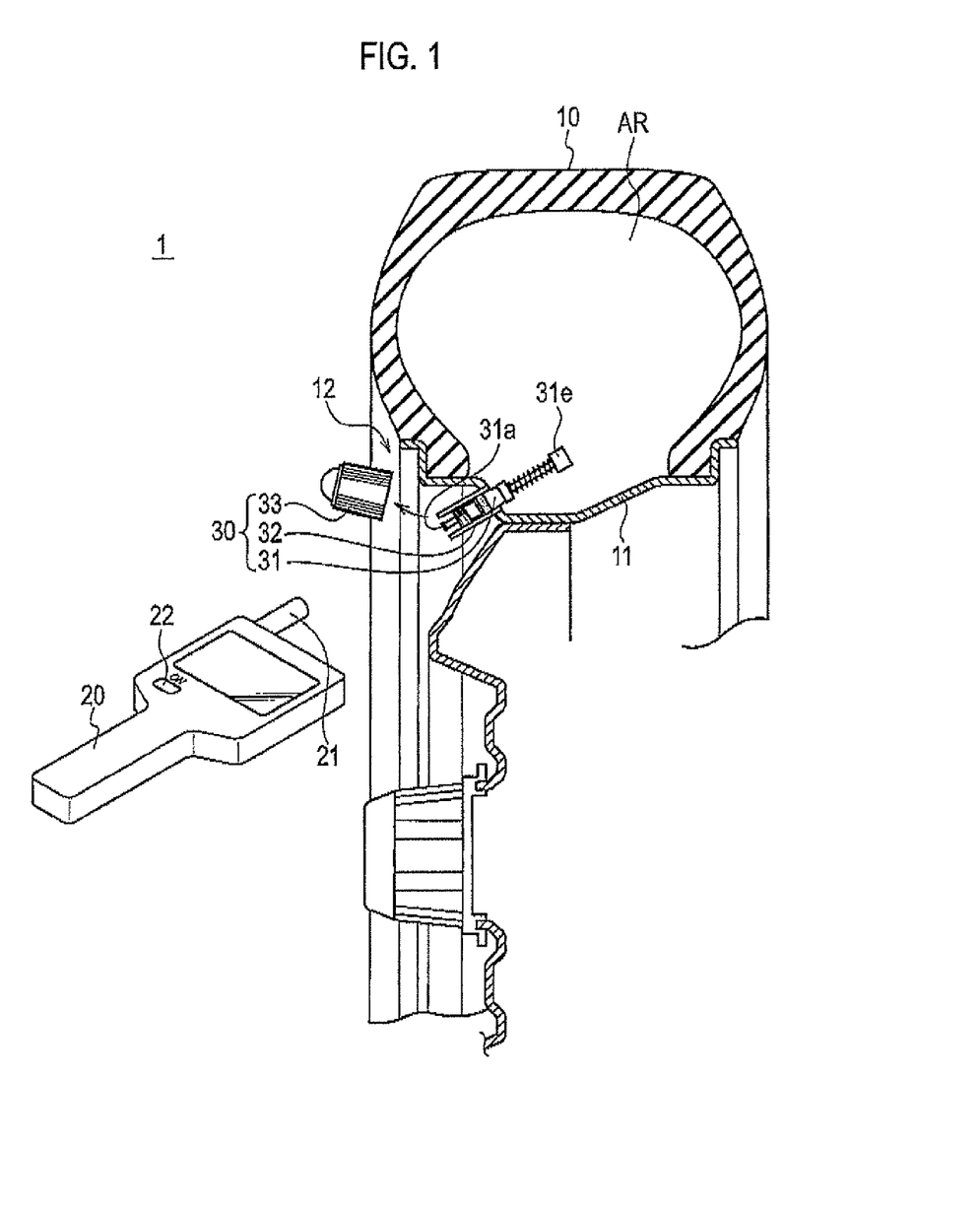
FIG. 1 is a diagram for explaining a schematic configuration of a tire inner pressure measurement system according to an embodiment of the present invention.

(1) Description of Schematic Configuration of Tire Inner Pressure Measurement System FIG. 1 is a diagram for explaining a schematic configuration of the tire inner pressure measurement system 1 according to an embodiment. FIG. 1 illustrates a tire 10 and a rim wheel 11 mounted with the tire 10. The rim wheel 11 is provided with a valve 30 that injects the air into an air room AR formed between the tire 10 and the rim wheel 11.

The valve 30 includes a valve core 31, a valve stem 32, and a valve cap 33. The valve core 31 includes an air room-side end portion 31e communicating with the air room AR formed between the tire 10 and the rim wheel 11, and an inlet 31a through which the air is injected. The valve core 31 is inserted into the valve stem 32 and is mounted in the rim wheel 11. The valve cap 33 is mounted around the valve stem 32 to cover the inlet 31a of the valve core 31.

The tire inner pressure measurement system 1 according to the embodiment includes a detector 40 (not illustrated in FIG. 1) configured to detect the inner pressure of the tire and an acquisition apparatus 20 configured to acquire data regarding the inner pressure of the tire detected by the detector 40. The acquisition apparatus 20 includes an antenna unit 21, an input unit 22 (only a part thereof is illustrated) for receiving input from a user, and the like, and acquires the data regarding the inner pressure of the tire 10, which is detected by the detector 40, in a non-contact manner. In the embodiment, the detector 40 is arranged in the valve 30.

Figure 2:
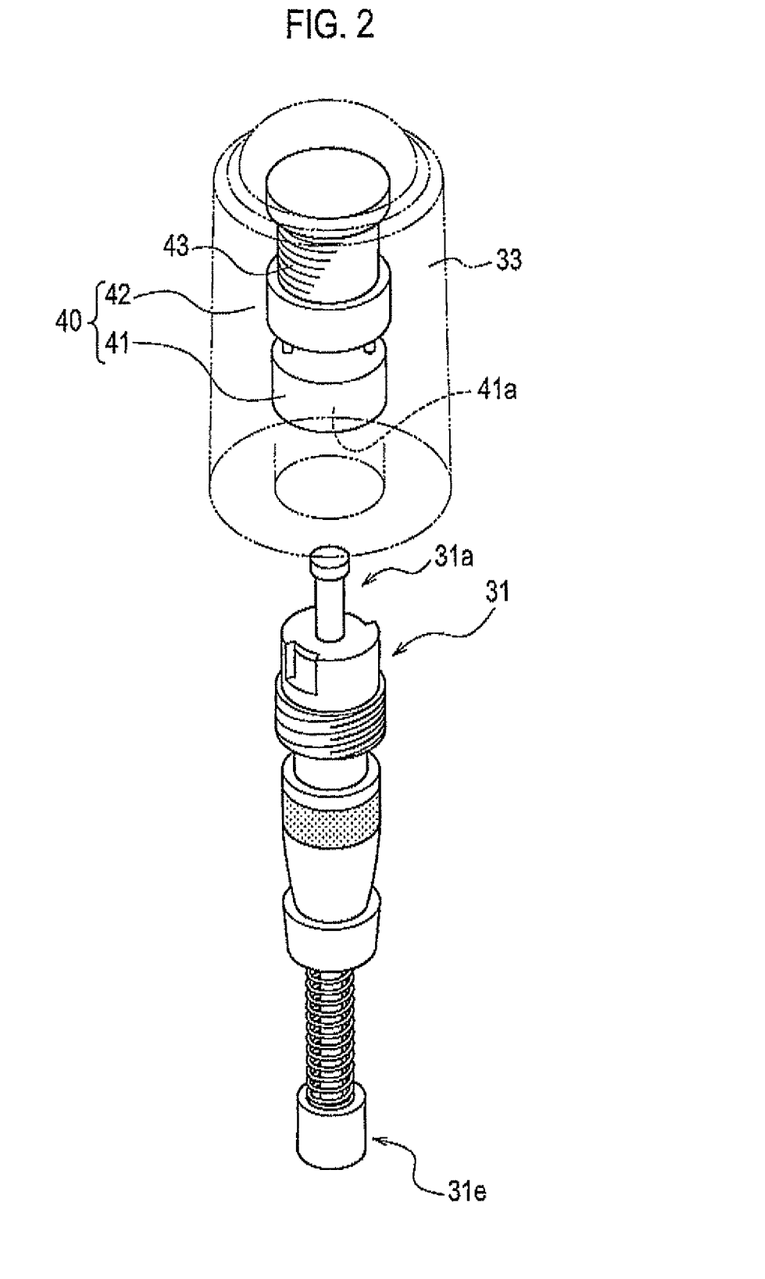
FIG. 2 is a diagram for explaining a schematic configuration of a detector and an arrangement position of the detector.

(2) Description of Configuration Of Detector and Arrangement Position of Detector FIG. 2 is a diagram for explaining a schematic configuration of the detector 40 and an arrangement position of the detector 40. The detector 40 includes a capacitive sensor 41 and an antenna unit 42. The capacitive sensor 41 is a capacitor having capacitance which changes according to a change in an inter-electrode distance.

The antenna unit 42 is formed by a coil obtained by winding a conductive wire 43 around a core material (not illustrated). That is, the capacitive sensor 41 and the antenna unit 42 constitute an LC resonance circuit.

The capacitive sensor 41 has a detection surface 41a for detecting pressure. In the embodiment illustrated in FIG. 2, the capacitive sensor 41 is arranged in the valve cap 33 such that the detection surface 41a faces the inlet 31a. Furthermore, the antenna unit 42 is also arranged in the valve cap 88. In the embodiment illustrated in FIG. 2, when the valve cap 83 is mounted around the valve stem 32, the detection surface 41a presses the inlet 31a, so that the inner pressure of the tire is applied to the detection surface 41a. In addition, in FIG. 2, the valve stem 32 is omitted.

Figure 3:
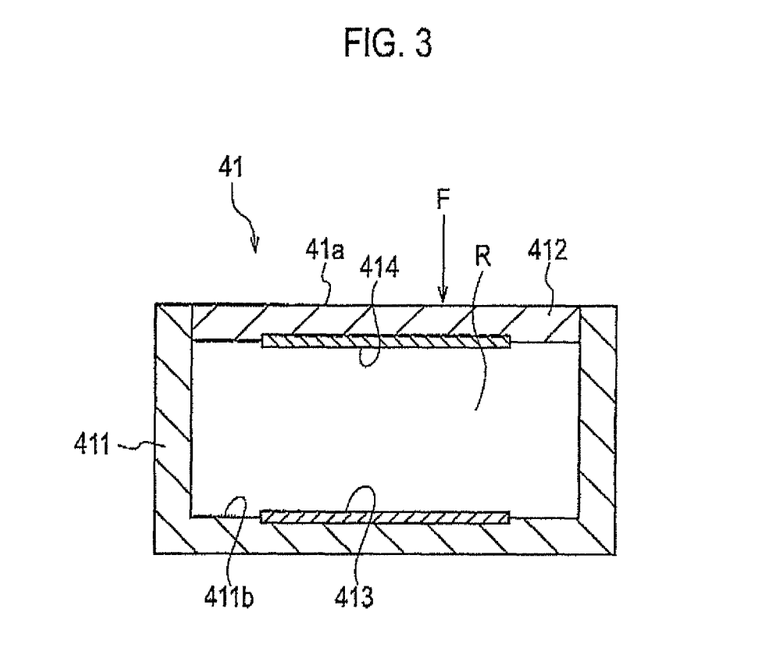
FIG. 3 is a diagram for explaining a configuration of the detector.

FIG. 3 is a configuration diagram for explaining the configuration of the detector 40. The capacitive sensor 41 includes a sensor casing 411, and a diaphragm unit 412 mounted in the sensor casing 411 such that a sealed space (called an air-tight compartment) R is formed.

The sensor casing 411 forming the air-tight compartment R is provided at the bottom portion 411b thereof with a casing-side electrode 413. Furthermore, the diaphragm unit 412 is provided at an inner side thereof with a diaphragm electrode 414. The casing-side electrode 413 and the diaphragm electrode 414 constitute a capacitor.

In the detector 40, when force (an arrow F illustrated in FIG. 3) applied to the diaphragm unit 412 from an exterior is increased, the diaphragm unit 412 is deformed to decrease the capacity of the air-tight compartment R. Furthermore, when the force is decreased, the diaphragm unit 412 is deformed to increase the capacity of the air-tight compartment R. In the capacitor, since the capacitance is increased as an inter-electrode interval is reduced, the capacitance is increased as the pressure applied to the diaphragm unit 412 is high.

(3) Circuit Configuration of Tire Inner Pressure Measurement System

Next, the circuit configuration of the tire inner pressure measurement system 1 will be described. In the embodiment, the following two patterns will be described below.

(3-1) First Circuit Configuration

Figure 4:
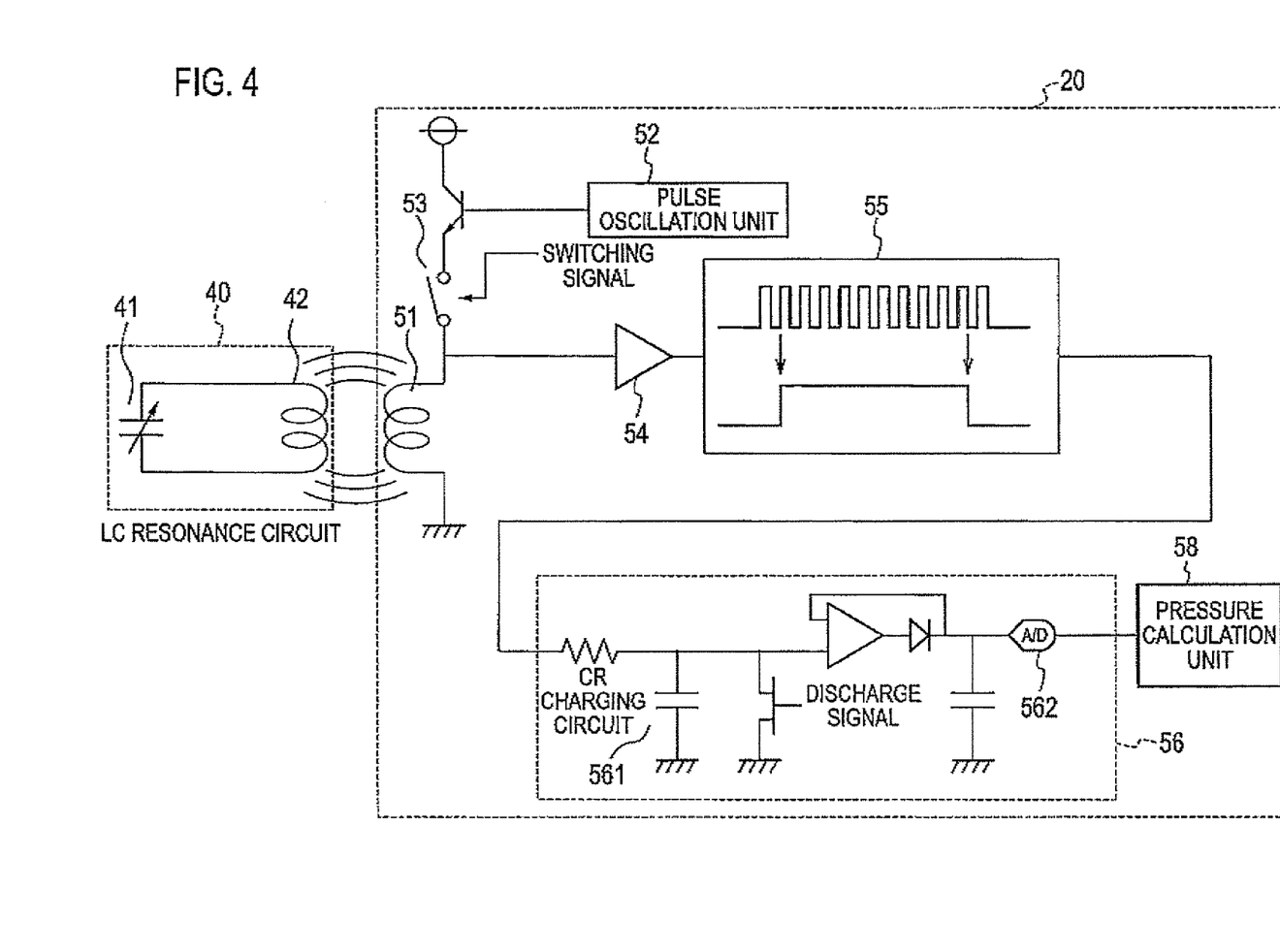
FIG. 4 is a diagram for explaining a first circuit configuration of the tire inner pressure measurement system.

FIG. 4 is a diagram for explaining a first circuit configuration of the tire inner pressure measurement system. The tire inner pressure measurement system 1 includes the detector 40 configured to detect the inner pressure of the tire 10, and the acquisition apparatus 20 configured to acquire data regarding the inner pressure of the tire 10 detected by the detector.

The detector 40 constitutes the LC resonance circuit including the capacitive sensor 41 and the antenna unit 42.

In the LC resonance circuit, attenuation characteristics of a resonant frequency change according to an increase in capacitance. In this regard, in the embodiment, resonant waveforms of a resonant frequency between the capacitive sensor 41, which is a capacitor, and a coil constituting the antenna unit 42 are detected, and a period from the rise to the fall of waveforms, which are obtained by dividing a predetermined number of waveforms, is converted into a voltage value.

The acquisition apparatus 20 includes an antenna unit 51, a pulse oscillation unit 52, a switching circuit 53, an amplification circuit 54, a division circuit 55, a conversion unit 56, and a pressure calculation unit 58, and is controlled by a control unit (not illustrated).

The antenna unit 51 is embedded in the antenna unit 21 illustrated in FIG. 1. The antenna unit 51 is formed by a coil obtained by winding a conductive wire around a core material, and generates induced electromotive force in the antenna unit 42 of the detector 40 by electromagnetic induction. Furthermore, the antenna unit 51 is configured to acquire resonant waveforms in tune with the resonance of the LC resonance circuit including the capacitive sensor 41 charged by the electromotive force generated in the antenna unit 42, and the antenna unit 42.

The pulse oscillation unit 52 is configured to generate a starting pulse to be applied to the antenna unit 42 of the detector 40. The switching circuit 53 is configured to switch a starting mode, in which the starting pulse generated by the pulse oscillation unit 52 is sent to the antenna unit 51, and an acquisition mode, in which the resonant waveforms are acquired from the antenna unit 42, according to a switching signal sent from the control unit (not illustrated).

The amplification circuit 54 is configured to amplify the resonant waveforms acquired from the antenna unit 51 in tune with the resonance of the LC resonance circuit of the detector 40. In this way, it is possible to separate a noise component and a signal component.

The division circuit 55 is configured to divide a predetermined number of waveforms among the amplified resonant waveforms into one pulse. For example, the division circuit 55 divides a pulse corresponding to 10 waveforms, which is obtained in a period until the obtained resonant frequency is attenuated, into one pulse.

The resonant waveforms immediately after the acquisition include a noise component by the influence of the starting pulse. Furthermore, since the resonant frequency is attenuated and is too weak according to the passage of time, separation from the noise component is difficult Therefore, waveforms immediately after starting to acquire are not employed, and resonant waveforms during a period until immediately before it is not possible to separate the noise component from when the noise component caused by the starting pulse becomes substantially negligible are extracted. In this way, the resonance circuit is extracted, so that it is possible to suppress the influence of noise, and to measure tire inner pressure with high accuracy. In addition, in the embodiment, the resonant waveforms are about 10 waveforms.

In the first circuit configuration, the conversion unit 56 includes a CR charging circuit 561. The CR charging circuit 561 is configured to charge the capacitor C during the period from the rise to the fall of the waveform obtained through the division. The charged voltage value is converted into a digital signal in an A/D converter 562. In the first circuit configuration, a time constant of the CR charging circuit 561 is set such that a change in the pressure detected in the capacitive sensor 41 becomes apparent as a voltage change.

The pressure calculation unit 58 is configured to associate the digital signal of the voltage value with the tire inner pressure. It is possible to prepare a result, which was obtained by measuring in advance a corresponding table of the voltage value and the tire inner pressure, by storing the result in a memory and the like. The pressure calculation unit 58 determines the tire inner pressure corresponding to the voltage value with reference to the corresponding table.

According to the tire inner pressure measurement system 1 of the embodiment, it is possible to measure the tire inner pressure as described above.

The tire inner pressure measurement system 1 having the aforementioned circuit configuration operates as follows. When an instruction of measurement start is inputted from the input unit 22 by a user, the switching circuit 53 is switched by the switching signal sent by the control unit such that the starting pulse generated by the pulse oscillation unit 52 is sent to the antenna unit 51.

The starting pulse generated by the pulse oscillation unit 52 is sent to the antenna unit 51. After the starting pulse is sent, the switching circuit 53 is switched such that the resonant waveforms are acquired from the antenna unit 42.

The antenna unit 51 generates induced electromotive force in the antenna unit 42 of the detector 40 by electromagnetic induction. The capacitive sensor 41 is charged by the electromotive force generated in the antenna unit 42. The capacitive sensor 41 has capacitance corresponding to the inner pressure of the tire. In the LC resonance circuit including the capacitive sensor 41 and the antenna unit 42, resonance having a resonant frequency corresponding to the capacitance is generated.

The antenna unit 51 acquires the resonant waveform of the LC resonance circuit including the capacitive sensor 41 and the antenna unit 42 in tune with the antenna unit 42.

Next, the (amplification circuit 54 amplifies the resonant waveforms acquired from the antenna unit 51. From the amplified signal, a noise component and a signal component are separated. As the signal component, 10 waveforms after a predetermined time passes from the reception are extracted.

Then, the division circuit 55 divides a predetermined number of waveforms among the amplified resonant waveforms into one pulse. The CR charging circuit 561 charges the capacitor C during the period from the rise of the one pulse obtained by the division to the fall thereof. The charged voltage value is converted into a digital signal in an A/D converter 562.

The pressure calculation unit 58 determines the tire inner pressure corresponding to the voltage value with reference to the corresponding table. According to the tire inner pressure measurement system 1 of the embodiment, the tire inner pressure is measured as described above.

(3-2) Second Circuit Configuration

Figure 5:
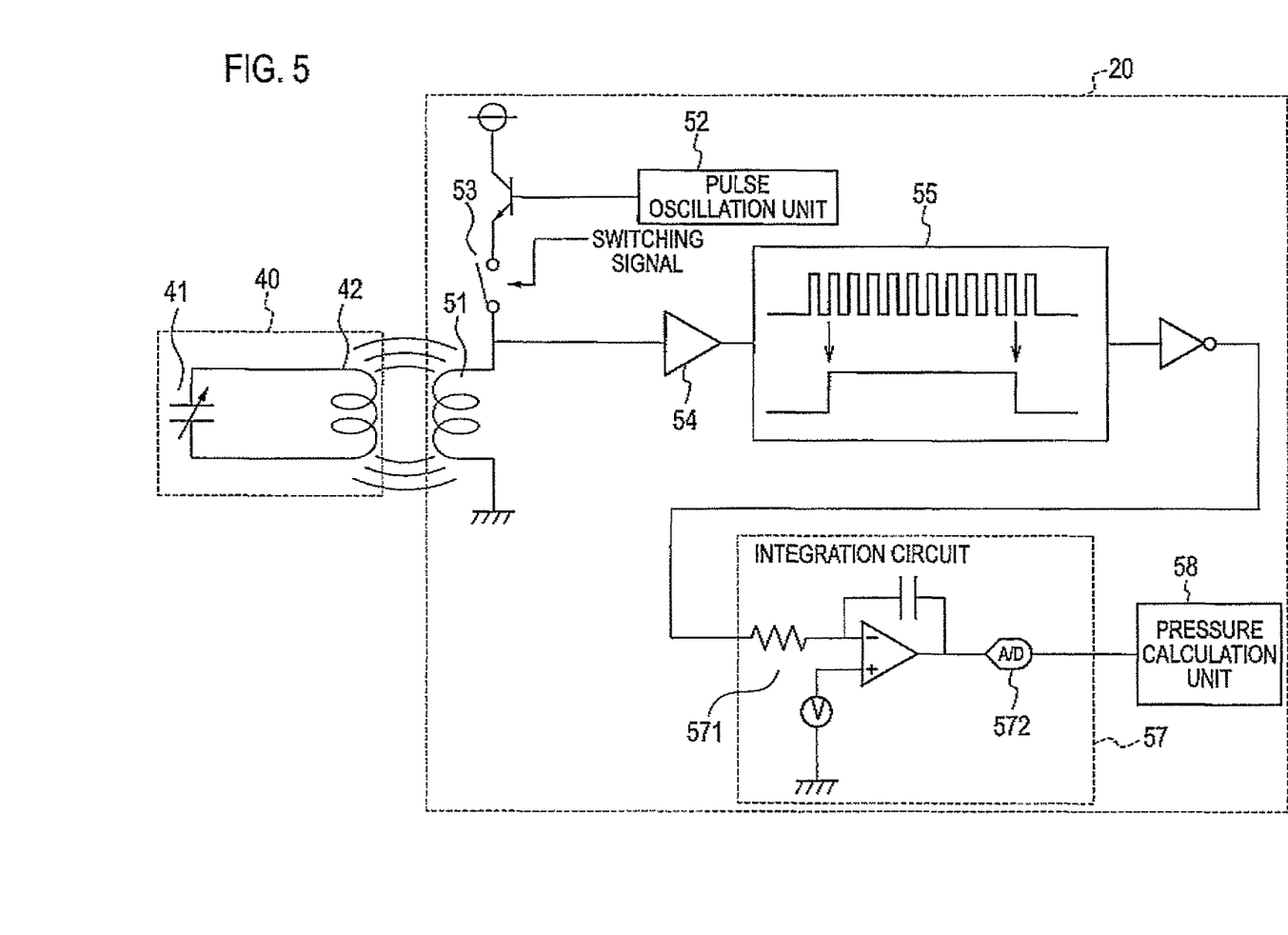
FIG. 5 is a diagram for explaining a second circuit configuration of the tire inner pressure measurement system.

FIG. 5 is a diagram for explaining a second circuit configuration of the tire inner pressure measurement system. In the second circuit configuration, a conversion unit 57 is provided instead of the conversion unit 56. The conversion unit 57 includes an integration circuit 571. The integration circuit 571 allows input to be changed from an Hi voltage state to an Lo voltage state during the period from the rise to the fall of the waveform obtained, through the division. An output voltage value of the integration circuit 571 is converted into a digital signal in an A/D converter 572.

(4) Operation and Effect

According to the tire inner pressure measurement system 1 of the embodiment, the acquisition apparatus 20 does not directly associate a change amount of the resonant frequency of the resonant waveform generated in the detector 40 with a change amount of the inner pressure of the tire, and converts the period from the rise to the fall of the waveform obtained by dividing the resonant waveforms into the voltage value. Specifically, the acquisition apparatus 20 is configured to be able to acquire the resonant waveform of the resonance circuit including the capacitive sensor charged by electromotive force and the detection-side antenna unit, and to measure the tire inner pressure associated with the period from the rise to the fall of the resonant waveform. Consequently, a change amount of the resonant frequency of the resonant waveform generated in the detector 40 is not directly associated with a change amount of the tire inner pressure, so that it is possible to suppress the reduction of accuracy due to the influence of noise and to detect the tire inner pressure with high accuracy.

Furthermore, the acquisition apparatus 20 calculates the inner pressure of the tire based on the conversion unit 56 (the conversion unit 57), which converts the period from the rise to the fall of one pulse obtained by dividing the resonant waveforms generated in the detector 40 into the voltage value, and the voltage value converted by the conversion unit 56.

For example, it is assumed to attempt that a change in a resonant frequency due to a difference in the capacitance of a capacitive sensor is directly detected. At this time, when a capacitive sensor, in which a change in capacitance is about 10 pF, is combined with a coil having an inductance L of 1000 pH, a resonant frequency generated is before and after 1.6 MHz. The resonant frequency is amplified, a noise component is removed, and a time from the rise to the fall of a pulse obtained by dividing a resonant waveform corresponding to 10 waveforms into one waveform is about 6.25 μs.

Since the capacitance of the capacitive sensor is normally changed about twice as large as an initial amount due to a pressure change, a change in the capacitance due to the pressure change is expressed by a difference of about 6.25 μs±several μs in the pulse obtained by dividing the resonant waveforms.

In this regard, in order to enable a change amount of the resonant frequency due to the difference in the capacitance of the capacitive sensor to be directly associated with a change amount of the inner pressure of the tire, the acquisition apparatus needs to have performance capable of measuring several μs is with resolution of about 0.001 μs, and to have CPU capable of performing sampling with a frequency of GHz order.

That is, when the change in the resonant frequency due to the difference in the capacitance of the capacitive sensor is directly associated with a change amount of the inner pressure of the tire, since the acquisition apparatus is expensive, an advantage that it is possible to extremely simplify the configuration of the detector may be lost.

In this regard, in the embodiment, the change amount of the resonant frequency is not directly associated with the change amount of the inner pressure of the tire, and the resonant waveform obtained from the antenna unit 42 of the detector 40 is converted into the voltage value. The resonant waveform is converted into the voltage value, so that it is possible for the acquisition apparatus 20 to have an inexpensive configuration as compared with the CPU capable of performing sampling with, a frequency of GHz order.

Furthermore, as described in the embodiment, a change in the capacitance of the capacitive sensor 41 arrangeable in the valve cap 33 is about several pF to about 20 pF.

Since the resonant frequency of the LC resonance circuit is expressed by $f = \pi/2(LC)^{1/2}$, when the inductance of the coil is increased, the value of the resonant frequency is decreased. Furthermore, when the inductance of the coil for resonance is increased, the capacitance component of the coil has a value not ignorable with respect to the capacitance of the capacitive sensor 41. Furthermore, when the inductance of the coil for resonance is increased, since a resistance component is increased, the resonant frequency is highly attenuated. As described above, when the inductance of the coil for resonance is increased, there is a problem that it is difficult to detect a signal of the resonant waveform.

In this regard, in the embodiment, it is preferable that the inductance of the coil for resonance, which is used and combined with the capacitive sensor 41 arrangeable in the valve cap 33, is set to about 1,000 μH or to be equal to or less than 1,000 μH.

(5) Modification of Detector (5-1) First Modification

Figure 6:
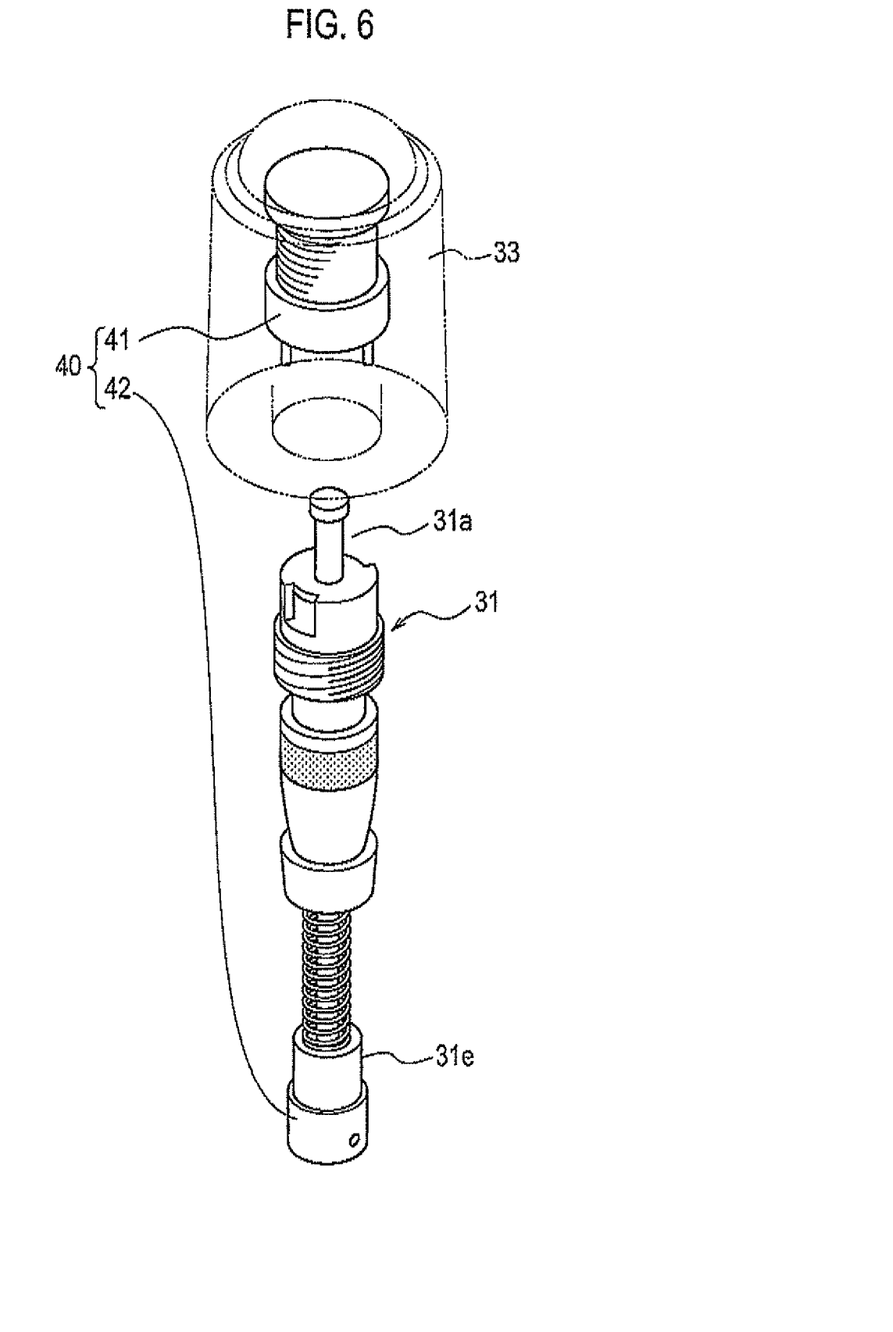
FIG. 6 is a diagram for explaining a modification of an arrangement position of the detector.

FIG. 6 is a diagram for explaining a first modification of an arrangement position of a detector. In the embodiment, in the detector 40, the capacitive sensor 41 and the antenna unit 42 are arranged adjacent to each other. However, the capacitive sensor 41 and the antenna unit 42 may be spaced apart from each other. That is, the capacitive sensor 41 may be arranged at the air room-side end portion 31e of the valve core 31 positioned in the air room AR formed between the tire 10 and the rim wheel 11. The capacitive sensor 41 and the antenna unit 42 are electrically connected by a conductive wire.

In the embodiment illustrated in FIG. 2, in the state in which the value cap 33 is mounted around the value stem 32, the detection surface 41*a* always receives the inner pressure of the tire. On the other hand, in the detector 40 according to the first modification, since the inlet 31*a* is not always pushed, air-tight performance of the tire is enhanced.

(5-2) Second Modification

Figure 7:
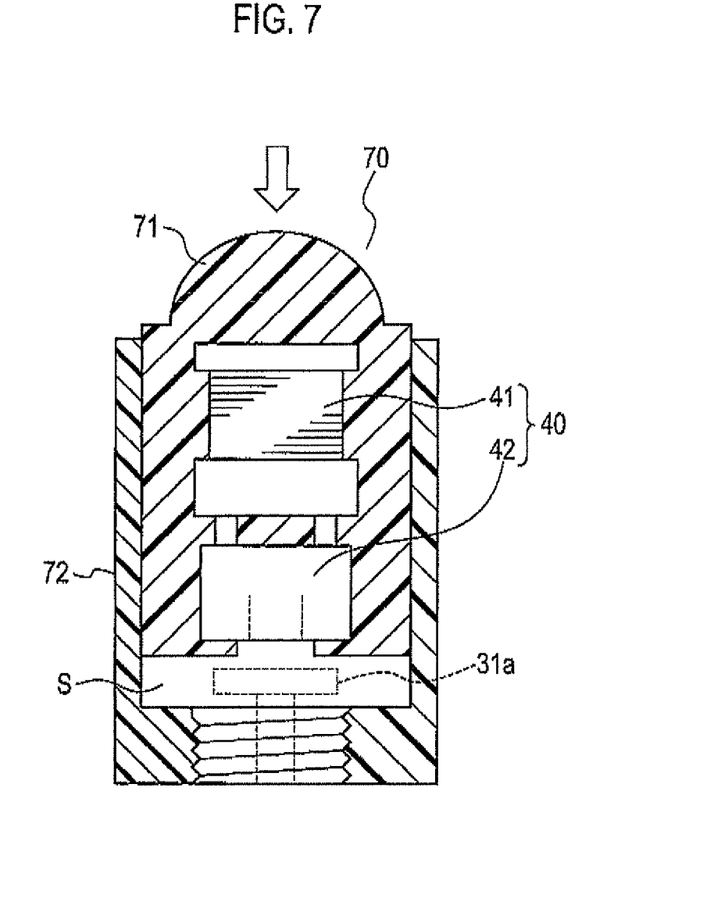
FIG. 7 is a diagram for explaining a modification of an arrangement position of the detector.

FIG. 7 is a diagram for explaining a second modification of an arrangement position of a detector. In the second modification, the structure of a valve cap is different from that of FIG. 2. In the embodiment illustrated in FIG. 7, a valve cap 70 includes a pushing unit 71 movably mounted toward the tire 10 along the direction in which the valve stem 32 extend portions, and a valve body 72 mounted in the valve stem 32, and the detector 40 is arranged in the pushing unit 71.

In the state in which the valve cap 70 is mounted in the valve stem 32, when the pushing unit 71 of the valve cap 70 is pushed, the detection surface 41*a* of the capacitive sensor 41 of the detector 40 embedded in the pushing unit 71 pushes the inlet 31*a*. In this way, a space s communicates with the interior of the tire and the inner pressure of the tire is applied to the detection surface 41*a*.

In the embodiment illustrated in FIG. 2, in the state in which the value cap 33 is mounted around the value stem 32, the detection surface 41*a* always receives the inner pressure of the tire. On the other hand, in the detector 40 according to the second modification, the interior of the valve cap 70 communicates with the interior of the tire only at the time of measurement. Normally, air-tightness is held by the valve core 31.

(6) Other Embodiments

As described above, although the content of the present invention was disclosed through the embodiments of the present invention, the descriptions and drawings that form a part of this disclosure are not to be considered as limitation to the present invention. Further, various substitutions and embodiments shall be apparent to a person skilled in the art based on this disclosure. For example, the embodiment of the present invention can be modified as follows.

A tire, to which the tire inner pressure measurement system 1 is applicable, is not limited. The tire includes a tire for a car, a tire for a truck and bus, a tire for an aircraft, and the like.

In the present embodiment, the capacitance of a capacitive sensor is set according to a standard inner pressure of a tire to be measured. When the capacitive sensor is changed, a coil size and the like (the number of windings, a diameter size) of an antenna unit are changed. Consequently, the acquisition apparatus 20 is allowed to have a function of changing the starting pulse applied to the detector 40, so that it is possible to correspond to a plurality of capacitive sensors (that is, measurement of the inner pressures of different types of tires).

Positions for mounting the capacitive sensor 41 and the antenna unit 42 constituting the detector 40 are not limited to the aforementioned example. In the valve core 31, the capacitive sensor 41 and the antenna unit 42 may be arranged between the inlet 31*a* and the air room-side end portion 31*e*. In addition, the shorter the distance between the capacitive sensor 41 and the antenna unit 42 is, and it is preferable that the capacitive sensor 41 is arranged at a portion at which a temperature change is small.

As described above, it is of course that the present invention includes various embodiments and the like not described here. Therefore, the technical range of the present invention is to be defined only by the inventive specific matter according to the adequate claims from the above description.

In addition, the entire content of Japanese Patent Application No. 2010-178940 (filed on Aug. 9, 2010) is incorporated in the present specification by reference.

INDUSTRIAL APPLICABILITY

The tire inner pressure measurement system according to the present invention is available for a tire inner pressure measurement system that measures the inner pressure of a tire used in a vehicle and the like.

The invention claimed is:

1. A tire inner pressure measurement system comprising: a detector that detects the inner pressure of a tire and an acquisition apparatus that acquires data regarding the inner pressure of the tire detected by the detector, wherein
    the detector comprises:
    a resonance circuit that includes: a capacitive sensor having capacitance changed according to a change in an inter-electrode distance by the inner pressure of the tire; and a detection-side antenna unit formed by a coil, the coil being obtained by winding a conductive wire around a coil material, the antenna unit being connected to the capacitive sensor,
    the acquisition apparatus comprises:
    an acquisition-side antenna unit that is formed by a coil obtained by winding a conductive wire around a coil material, that generates electromotive force in the detection-side antenna unit by electromagnetic induction, and that acquires resonant waveforms of the resonance circuit including the capacitive sensor charged by the electromotive force and the detection-side antenna unit;
    a driving unit that applies electromotive force to the detection-side antenna unit;
    a signal amplification unit that amplifies the resonant waveforms;
    a division unit that divides a predetermined number of waveforms among the amplified resonant waveforms;
    a conversion unit that converts a period from rise to fall of a waveform obtained by dividing the waveforms into a voltage value; and
    a pressure calculation unit that calculates the inner pressure of the tire based on the voltage value converted by the conversion unit.

2. The tire inner pressure measurement system according to claim 1, wherein
    the conversion unit comprises: a CR charging circuit having a capacitor and a resistor, and
    the conversion unit charges the capacitor over the period from the rise to the fall of the waveform obtained by dividing the waveforms, and
    associates a voltage value charged in the capacitor with the inner pressure of the tire.

3. The tire inner pressure measurement system according to claim 1, wherein
    the conversion unit comprises: an integration circuit, and
    the conversion unit associates a voltage value integrated over the period from the rise to the fall of the waveform obtained by dividing the waveforms, with the inner pressure of the tire.

4. The tire inner pressure measurement system according to claim 1, wherein
a rim wheel mounted with the tire is provided with a valve for injecting air, and
the valve comprises:
a valve core including an air room-side end portion communicating with an air room formed between the tire and the rim wheel, and an inlet;
a valve stem into which the valve core is inserted; and
a valve cap mounted around the valve stem to cover the inlet of the valve core, and
the capacitive sensor and the detection-side antenna unit are arranged in the valve cap.

5. The tire inner pressure measurement system according to claim 1, wherein
a rim wheel mounted with the tire is provided with a valve for injecting air, and
the valve comprises:
a valve core including an air room-side end portion communicating with an air room formed between the tire and the rim wheel, and an inlet;
a valve stem into which the valve core is inserted; and
a valve cap mounted around the valve stem to cover the inlet of the valve core, and
the capacitive sensor is arranged at the air room-side end portion of the valve core,
the detection-side antenna unit is arranged in the valve cap, and
the capacitive sensor is electrically connected to the detection-side antenna unit.

6. The tire inner pressure measurement system according to claim 2, wherein
a rim wheel mounted with the tire is provided with a valve for injecting air, and
the valve comprises:
a valve core including an air room-side end portion communicating with an air room formed between the tire and the rim wheel, and an inlet;
a valve stem into which the valve core is inserted; and
a valve cap mounted around the valve stem to cover the inlet of the valve core, and
the capacitive sensor and the detection-side antenna unit are arranged in the valve cap.

7. The tire inner pressure measurement system according to claim 3, wherein
a rim wheel mounted with the tire is provided with a valve for injecting air, and
the valve comprises:
a valve core including an air room-side end portion communicating with an air room formed between the tire and the rim wheel, and an inlet;
a valve stem into which the valve core is inserted; and
a valve cap mounted around the valve stem to cover the inlet of the valve core, and
the capacitive sensor and the detection-side antenna unit are arranged in the valve cap.

8. The tire inner pressure measurement system according to claim 2, wherein
a rim wheel mounted with the tire is provided with a valve for injecting air, and
the valve comprises:
a valve core including an air room-side end portion communicating with an air room formed between the tire and the rim wheel, and an inlet;
a valve stem into which the valve core is inserted; and
a valve cap mounted around the valve stem to cover the inlet of the valve core, and
the capacitive sensor is arranged at the air room-side end portion of the valve core,
the detection-side antenna unit is arranged in the valve cap, and
the capacitive sensor is electrically connected to the detection-side antenna unit.

9. The tire inner pressure measurement system according to claim 3, wherein
a rim wheel mounted with the tire is provided with a valve for injecting air, and
the valve comprises:
a valve core including an air room-side end portion communicating with an air room formed between the tire and the rim wheel, and an inlet;
a valve stem into which the valve core is inserted; and
a valve cap mounted around the valve stem to cover the inlet of the valve core, and
the capacitive sensor is arranged at the air room-side end portion of the valve core,
the detection-side antenna unit is arranged in the valve cap, and
the capacitive sensor is electrically connected to the detection-side antenna unit.

* * * * *